United States Patent [19]

Burcham, Jr. et al.

[11] Patent Number: 6,126,111
[45] Date of Patent: Oct. 3, 2000

[54] EMERGENCY FLIGHT CONTROL SYSTEM USING ONE ENGINE AND FUEL TRANSFER

[75] Inventors: Frank W. Burcham, Jr., Lancaster; John J. Burken, Tehachapi; Jeanette Le, Lancaster, all of Calif.

[73] Assignee: The United States of America as represented by the Administrator of the National Aeronautics and Space Administration, Washington, D.C.

[21] Appl. No.: 09/112,067

[22] Filed: Jul. 8, 1998

[51] Int. Cl.$^7$ .......................... B64C 17/10; B64C 15/02
[52] U.S. Cl. ................... 244/75 R; 244/51; 244/135 C
[58] Field of Search .................. 244/75 R, 76 R, 244/78, 80, 220, 221, 226, 93, 135 R, 135 C, 51

[56] References Cited

U.S. PATENT DOCUMENTS

| | | | |
|---|---|---|---|
| 2,684,217 | 7/1954 | Edwards | 244/135 |
| 2,823,880 | 2/1958 | Bergeson | 244/135 |
| 4,106,730 | 8/1978 | Spitzer et al. | 244/183 |
| 4,185,460 | 1/1980 | Moore et al. | 60/224 |
| 4,261,533 | 4/1981 | Roberts et al. | 244/7 |
| 4,266,743 | 5/1981 | Kelley | 244/182 |
| 4,420,808 | 12/1983 | Diamond et al. | 364/434 |
| 4,776,536 | 10/1988 | Hudson et al. | 244/135 |
| 4,913,380 | 4/1990 | Vardaman et al. | 244/135 |
| 4,932,609 | 6/1990 | Secchiaroli et al. | 244/135 C |
| 4,935,682 | 6/1990 | McCuen | 318/586 |
| 4,937,754 | 6/1990 | Buisson et al. | 354/463 |
| 4,964,599 | 10/1990 | Farineau | 244/195 |
| 5,000,404 | 3/1991 | Martorella | 244/188 |
| 5,113,346 | 5/1992 | Orgun et al. | 364/428 |
| 5,127,608 | 7/1992 | Farineau et al. | 244/76 |
| 5,321,945 | 6/1994 | Bell | 60/39.15 |
| 5,493,497 | 2/1996 | Buus | 364/434 |
| 5,531,402 | 7/1996 | Dahl | 244/75 |
| 5,660,358 | 8/1997 | Grafwallner et al. | 244/135 |

OTHER PUBLICATIONS

Transcript of Recording of Capt. Al Haynes Interview on May 24, 1991 Provided by Nasa–Dryden.

*Primary Examiner*—Robert P. Swiatek
*Attorney, Agent, or Firm*—John H. Kusmiss

[57] ABSTRACT

A system for emergency aircraft control uses at least one engine and lateral fuel transfer that allows a pilot to regain control over an aircraft under emergency conditions. Where aircraft propulsion is available only through engines on one side of the aircraft, lateral fuel transfer provides means by which the center of gravity of the aircraft can be moved over to the wing associated with the operating engine, thus inducing a moment that balances the moment from the remaining engine, allowing the pilot to regain control over the aircraft. By implementing the present invention in flight control programming associated with a flight control computer (FCC), control of the aircraft under emergency conditions can be linked to the yoke or autopilot knob of the aircraft. Additionally, the center of gravity of the aircraft can be shifted in order to effect maneuvers and turns by spacing such center of gravity either closer to or farther away from the propelling engine or engines. In an alternative embodiment, aircraft having a third engine associated with the tail section or otherwise are accommodated and implemented by the present invention by appropriately shifting the center of gravity of the aircraft. Alternatively, where a four-engine aircraft has suffered loss of engine control on one side of the plane, the lateral fuel transfer may deliver the center of gravity closer to the two remaining engines. Differential thrust between the two can then control the pitch and roll of the aircraft in conjunction with lateral fuel transfer.

9 Claims, 1 Drawing Sheet

EMERGENCY FLIGHT CONTROL SYSTEM USING ONE ENGINE AND FUEL TRANSFER

BACKGROUND OF THE INVENTION

1. Field of the Invention

This invention relates to aircraft control under emergency conditions, and more particularly to aircraft control by means of lateral fuel transfer and engine thrust control acting in tandem to provide aircraft navigational control.

2. Description of the Related Art

Aircraft, particularly large commercial aircraft carrying hundreds of passengers over global distances, are similar to any aircraft in their use of flight control surfaces to navigationally control the craft. These control surfaces include the ailerons on the wings as well as the elevators and rudders present in the tail section. Engines are usually distributed underneath each wing, either alone or in pairs, and for some aircraft the vertical stabilizer also includes a tail engine. Fuel sufficient for long journeys (with the cargo and personnel loads involved) may be distributed throughout the aircraft in the wings and the cargo sections of the craft. In order to effect control over the fuel and to allocate weight within the aircraft, lateral fuel transfer between individual fuel tanks is well known and occurs often. By providing control over lateral fuel transfer between individual fuel tanks, fuel weight and space can be allocated and controlled within the confines of the airframe.

Occasionally, and although redundant systems are designed and implemented to work against such occurrences, emergency conditions arise where absolute and total failure of control over all control surfaces arises. This was the case with United Airlines Flight 232 when it suffered a complete loss of all three redundant hydraulic systems on Jul. 19, 1989 due to structural failure in the tail engine. The pilots had only control over thrust in the remaining two engines in order to guide the plane into Sioux City, Iowa. Although many lives were saved, many lives were also lost in the crash landing of the aircraft.

United Airlines Flight 232 relied on throttle controls of engines No. 1 and No. 3, the two wing engines, to provide navigational control of the aircraft. However, had one of the wing engines also gone out in conjunction with the tail engine, that would have left only a single engine with which to fly the plane. While it is possible to fly a commercial airplane with only one engine, without the use of hydraulic controls, and without the use of center of gravity control, the task becomes impossible. It is possible that under emergency conditions, such single engine flight control must be effected without the use of hydraulic controls. Under such circumstances, it becomes necessary (possibly leading to a greater rate of survival) to augment control by altering the center of gravity of the aircraft by shifting the location of the fuel within the confines of the airframe. The present invention sets forth means by which such emergency control of the aircraft may be effected through one engine and lateral fuel transfer.

SUMMARY OF THE INVENTION

The present invention provides for greater aircraft control during emergency conditions when engine control is only available under one wing, or available only under one wing and the tail engine. The engines under the other wing having failed, use of lateral fuel transfer provides means by which the center of gravity of the aircraft may be shifted so as to provide control over roll and pitch in conjunction with the operating engines.

Fuel transfer control is known in all large airplanes so that the fuel may be shifted throughout the confines of the airframe. By controlling the center of gravity of the aircraft via fuel transfer, and by coordinating engine thrust in conjunction with such fuel transfer, roll and pitch control of large aircraft having a plurality of fuel tanks may be effected.

In so effecting such emergency control over the aircraft, flight control computers (FCC) can be programmed to accommodate the specific operating characteristics of the aircraft in light of its emergency conditions, engine performance, and available fuel. Such control may be linked or associated with the flight yoke or autopilot knob so that control of the airplane is delivered to the pilot under familiar circumstances. Where the flight yoke or autopilot knob would normally effect control over the aerodynamic control surfaces, instead, the yoke or autopilot knob then controls engine thrust and lateral fuel transfer within the confines of the airframe.

OBJECTS OF THE INVENTION

It is an object of the present invention to provide emergency navigational control for aircraft having a plurality of fuel tanks and a loss of aerodynamic surface control.

It is an additional object of the present invention to provide navigational control for an aircraft without engine power on one side of the aircraft or under one wing.

It is an additional object of the present invention to provide navigational control for an aircraft using at least one engine and lateral fuel transfer.

These and other objects and advantages of the present invention will be apparent from a review of the following specification and accompanying drawings.

DESCRIPTION OF THE PREFERRED EMBODIMENT(S)

Figure 1:
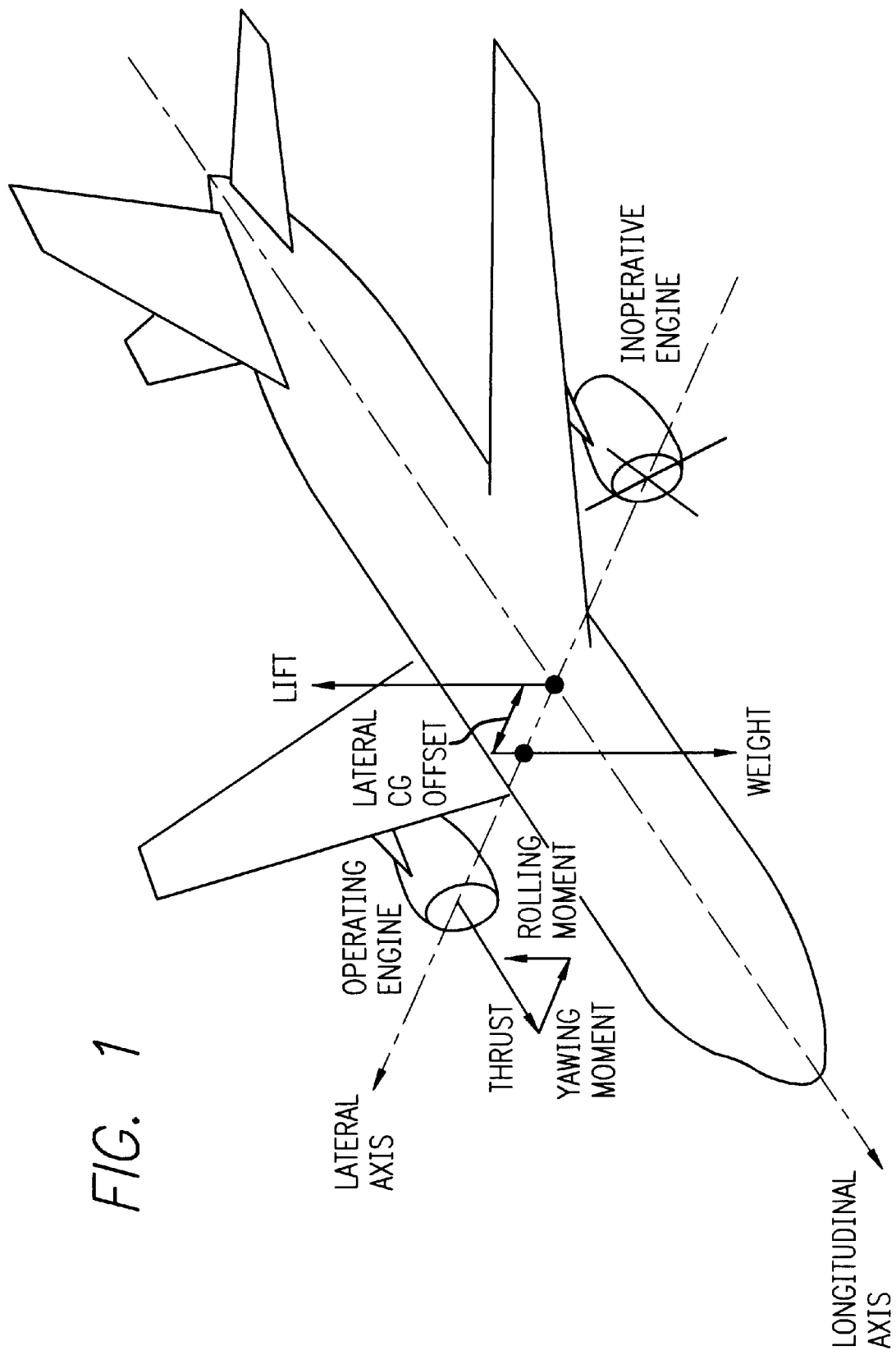
FIG. 1 shows a top left perspective view of an airplane schematic indicating the relevant forces arising from engine failure and subsequent fuel transfer.

Under normal conditions, control of an aircraft is delivered by hydraulic, cable, or pressurized control surface such as ailerons as well as the use of engine thrust. Control over attitude, altitude, pitch, roll, and yaw are all delivered to the pilot for navigational control of the aircraft by these systems. Catastrophic failure of any one of these systems can lead to dire consequences, particularly a crash of the aircraft with the ground. In order to avoid such catastrophes, hydraulic systems are redundantly implemented so as to provide two or more independent controls over the aerodynamic control surfaces as well as the engines.

Under unusual circumstances, total loss of control over the aerodynamic control surfaces can occur. Occasionally, this will be accompanied by loss of one or more wing engines such that the aircraft only receives propulsion from one or more engines under one wing and a tail engine, if present. In such a situation, control will not be possible unless the controlled use of lateral fuel transfer is added.

Large aircraft generally have several fuel tanks in which fuel is stored. Fuel may be transferred selectably and independently between all of such fuel tanks. When the fuel is moved from one tank to another, the weight of the fuel alters the center of gravity of the aircraft and, correspondingly, torques upon the aircraft exerted by engine thrust. Consequently, it is an available emergency control to provide fuel transfer between differing portions of the aircraft in order to alter the center of gravity and to deliver greater control to the pilot.

Experimentation will determine for each aircraft the best manner in which to affect such control. Such experimentation is not seen as being undue as the properties of fuel transfer in aircraft are well known in the art. However, to affect emergency navigational control over an aircraft by combining lateral fuel transfer with the thrust of at least one engine is believed to be heretofore unseen.

It is possible to provide roll control for the aircraft using differential engine thrust. However, such roll control using differential engine thrust requires at least one engine on each wing to provide such roll control. If either engine or if all engines on one wing fail or fails, there is no such roll control as there is no controllable thrust differential between the left and right wings. Under such circumstances, the fuel transfer system of the aircraft can move the aircraft's center of gravity toward or into the wing with the operating engine. The control system associated with the engine and this system then provides control for both roll and pitch of the aircraft. By balancing the torques on the aircraft arising from a distant center of gravity, propulsion from the engine then provides control over the aircraft. When implemented into flight control computers (FCC), a link to the yoke or other control system can be established and emergency control over the aircraft can be affected by implementing the engine control/lateral fuel system of the present invention system.

Where aircraft with lateral fuel transfer systems have three or four engines, modifications of the present system can be achieved without undue experimentation that provide for the circumstance where engine control fails on one side of the aircraft with respect to engines associated with one of the wings. In this case, lateral fuel transfer is coordinated with the separate manipulation of thrust of the two remaining engines to regain and affect control over the aircraft.

Tens of thousands of pounds of fuel are used by modern global aircraft. The shifting of several tons of fuel throughout the aircraft can have significant impact upon the location of the center of gravity. Under emergency conditions, where the pilot must control the aircraft where engines have been lost on one side of the aircraft, the lateral fuel transfer of such weight can have significant impact upon the center of gravity, and therefore control over the aircraft. Upon familiarizing himself or herself with the response characteristics of the aircraft under such conditions, the pilot can accommodate for flight conditions and affect navigational control of the aircraft. In conjunction with the flight control computer (FCC), the pilot is able to affect the most appropriate disposition and coordination between engine thrust and lateral fuel transfer via the familiar flight yoke or autopilot knob.

Below, control laws for the present fuel transfer system are set forth in terms familiar to those acquainted with the art. Generally, the Control law structure is same as for baseline propulsion controlled aircraft (PCA), and are presented only for reference. The fuel transfer control laws for PCA will most likely be different for any given airplane.

Fuel Transfer PCA Control Laws eprgam=kgamref*[kgamc*gamma−kgam*gamma−kq*q−kgamdot* gammadot+kgamint*gammaint]; and eprphi=kphiref*[kphic*(phi-phitrirn)−kphi*(phi-phitrim)−kp*p+kbdot*betadothat]

The ratios of lateral center of gravity (Lat-CG) gains to baseline PCA gains are:

| | |
|---|---|
| kgamref | 1.3 |
| kgamc | 1.0 |
| kq | 1.0 |
| kgamdot | 1.0 |
| kgamint | 1.0 |
| kgam | 1.0 |
| kphiref | 5.0 |
| kphic | 0.85 |
| kphi | 1.0 |
| kp | 1.0 |
| kbdot | 2.0 |

Engine epr control is as follows:

eprc3=eprtrim3+2*eprgam+eprphi; and eprc4=eprtrim4−1*eprgam+eprphi.

Baseline PCA

The PCA longitudinal control laws are as follows:

tgamc=delta thrust command/engine (lbs/eng) for flight path angle control.

eprgamc=delta epr command/engine for flight path angle control.

$\gamma_c$=commanded flight path angle (deg.)
 (pilot input from MCP knob in MCP mode, calculated in ILS Coupled mode)

$\phi_c$=commanded bank angle (deg.)
 (pilot input from MCP knob in Bank mode, calculated in MCP Track mode)

Longitudinal Control Law Structure tgamc=kgamref*tgain*[(kgamc*$\gamma_c$−kgam*$\gamma$)+kgamint*$\gamma_{int}$−kq*qf−kgamdot*$\gamma_{dorf}$+kgamphi*$\gamma\phi$]

eprgamc=kpitmode*tgamc*keng keng=1/56,000 qf=[1/(0.5*s+1)]*q $\gamma_{int}$=($\gamma_c$−$\gamma$)/s, absolute value $\gamma_{int}$<40.

$\gamma_{dorf}$=[s/(s+1/taugamf)]*$\gamma$ $\gamma\phi$=54*[1/(taugamphi*s+1)][1−cos($\phi_c$)]

tgain=(sea level pressure)/(ambient pressure)

kpitmode=1.00 for all four engine configuration.

kpitmode=2.00 for inboard engine only configuration.

kpitmode=2.00 for outboard engine only configuration.

Longitudinal Control Law Gains

| | Mechanically Jammed (no controls float) | | | Complete Hydraulic Failure (controls floating) | |
|---|---|---|---|---|---|
| | 20 flaps lg down 165 kt | 20 flaps lg down 225 kt | clean 285 kt | 0 flaps lg down 235 kt | clean 265 kt |
| kgamref | 0.08 | 0.08 | 0.11 | 0.05 | 0.11 |
| kgamc | 0.80 | 2.00 | 2.00 | 2.00 | 2.00 |
| kgam | 0.80 | 2.00 | 2.00 | 2.00 | 2.00 |
| kgamdot | 1.60 | 5.20 | 40.30 | 7.20 | 40.30 |
| taugamdot | 4.00 | 4.00 | 1.00 | 4.00 | 1.00 |
| kgamint | 0.04 | 0.07 | 0.08 | 0.07 | 0.08 |
| kq | 4.00 | 5.50 | 5.50 | 5.50 | 5.50 |
| kgamphi | 1.25 | 1.25 | 1.00 | 1.25 | 1.00 |
| taugamphi | 3.50 | 3.50 | 1.50 | 3.50 | 1.50 |

Gain Scheduling thain with Altitude h=altitude (ft.) h1=h/1000, h2=h1*h1, h3=h1*h2 tgain=1.0000+0.43123*h1−0.0000525*h2+0.0000423*h3

The PCA lateral-directional control laws are as follows:

tpsic=delta thrust command/engine (lbs/eng) for psi track angle control.

eprpsic=delta epr command/engine for psi track angle control.

$\psi_c$=commanded track angle, deg. (pilot input from MCP knob in Track mode).
$\phi_c$=computed bank angle, deg. (based on track angle command).

Lateral-Directional Control Law Structure
tpsic=kphiref*[(kphic*$\phi_c$−kgam*$\phi$)−kp*p−betastar]
eprpsic=krollmode*tpsic*keng keng=1/56,000
betastar=[kbetadot*s/(s+1/taubdot)][g*$\phi$/vtrue−r]
$\phi_c$=kpsic*(vtrue/g)*[$\psi_c$−$\psi_{uk}$] when in Track mode.
krollmode=0.65 for all four engine configuration.
krollmode=2.20 for inboard engine only configuration.
krollmode=1.40 for outboard engine only configuration.

Lateral-Directional Control Law Gains

|  | Mechanically Jammed (no controls float) | | | Complete Hydraulic Failure (controls floating) | |
| --- | --- | --- | --- | --- | --- |
|  | 20 flaps lg down 165 kt | 20 flaps lg down 225 kt | clean 285 kt | 0 flaps lg down 235 kt | clean 265 kt |
| kphiref | 0.0188 | 0.0188 | 0.0250 | 0.0108 | 0.0250 |
| kphic | 0.2500 | 0.3550 | 0.3550 | 0.3550 | 0.3550 |
| kphi | 0.2000 | 0.3050 | 0.3050 | 0.3050 | 0.3050 |
| kp | 0.2000 | 0.0200 | 0.2200 | 0.0200 | 0.2200 |
| kbetadot | −2.1000 | −2.1000 | −2.1000 | −2.1000 | −2.1000 |
| taubdot | 0.7000 | 0.7000 | 0.7000 | 0.7000 | 0.7000 |
| kpsic | 0.1200 | 0.1200 | 0.0500 | 0.1200 | 0.0500 |

Max bank angle may be selected by the pilot or may operate in an automatically limited mode. The automatic limits for bank angle vary with altitude as follows:
Auto bank angle command limit=21.8−1.7*tgain (tgain=psi/pa)

at 2,000 ft altitude, $\phi_{max}$ command=20.0 deg.
at 10,000 ft altitude, $\phi_{max}$ command=19.3 deg.
at 35,000 ft altitude, $\phi_{max}$ command=15.0 deg.

Nomenclature List

| | |
| --- | --- |
| kgam | flight path (gamma) gain |
| kgamref | flight path reference gain |
| kgamc | flight path command gain |
| kq | pitch rate feedback gain |
| kgamdot | flight path rate feedback gain |
| kgamint | flight path integrator gain |
| q | pitch rate |
| gamma | flight path |
| gammadot | flight path rate |
| eprgam | engine pressure ratio due to longitudinal control |
| eprphi | engine pressure ratio due to lateral control |
| kphiref | bank angle reference gain |
| kphic | bank angle command gain |
| kphi | bank angle gain |
| kp | roll rate feedback gain |
| kbdot | sideslip rate feedback gain |
| betadothat | sideslip rate estimate |
| phi | bank angle |
| phitrim | bank angle trim |
| p | roll rate |
| gammaint | flight path angle integration signal |
| epr 3 | right wing inboard engine pressure ratio |
| epr4 | right wing outboard engine pressure ratio |

While the present invention has been described with regards to particular embodiments, it is recognized that additional variations of the present invention may be devised without departing from the inventive concept.

What is claimed is:

1. A navigational control for an aircraft having an engine and the ability to laterally transfer fuel between fuel tanks, comprising:

a thrust control, said thrust control controlling thrust of the engine;

a lateral fuel transfer control, said lateral fuel transfer control controlling lateral transfer of fuel between said fuel tanks to control and shift a center of gravity of the aircraft; and a coordinator, said coordinator coupled to said thrust control and said lateral fuel transfer control, said coordinator coordinating said thrust control and said lateral fuel transfer control to effect navigational control over the aircraft; whereby navigational control over the aircraft is effected by said coordinator when said coordinator adjustably controls said thrust of the engine and location of fuel between and among said fuel tanks in conjunction with one another.

2. The navigational control for an aircraft of claim 1, wherein the engine further comprises:

an engine under a wing of the aircraft.

3. The navigational control for an aircraft of claim 1, wherein said lateral fuel transfer control further comprises:

a lateral fuel transfer control controlling fuel transfer between fuel tanks located in left, right, fore, and aft sections of the aircraft.

4. The navigational control for an aircraft of claim 1, wherein said coordinator further comprises:

a flight control computer, said flight control computer implementing flight control software coordinating said thrust control and said lateral fuel transfer control.

5. The navigational control for an aircraft of claim 4, wherein said coordinator further comprises:

a flight yoke or autopilot knob, said flight yoke or autopilot knob coupled to said flight control computer and coordinatingly controlling engine thrust via said thrust control and lateral fuel allocation via said lateral fuel transfer control to deliver navigational control of the aircraft to a pilot.

6. A navigational control for an aircraft having an engine and the ability to laterally transfer fuel between fuel tanks, comprising:

a thrust control, said thrust control controlling thrust the engine;

a lateral fuel transfer control, said lateral fuel transfer control controlling lateral transfer of fuel between said fuel tanks to control and shift a center of gravity of the aircraft;

a flight control computer, said flight control computer coupled to said thrust control and said lateral fuel transfer control, said flight control computer coordinating said thrust control and said lateral fuel transfer control to effect navigational control over the aircraft, said flight control computer implementing flight control software coordinating said thrust control and said lateral fuel transfer control; and a flight yoke or autopilot knob, said flight yoke or autopilot knob coupled to said flight control computer and coordinatingly controlling engine thrust via said thrust control and lateral fuel allocation via said lateral fuel transfer control to deliver navigational control of the aircraft to a pilot; whereby navigational control over the aircraft is effected by said flight yoke or autopilot knob when said flight yoke or autopilot knob adjustably controls said thrust of the engine and location of fuel between and among said fuel tanks in conjunction with one another.

7. The navigational control for an aircraft of claim 6, wherein the engine further comprises:

an engine under a wing of the aircraft.

8. The navigational control for an aircraft of claim 6, wherein said lateral fuel transfer control further comprises:

a lateral fuel transfer control controlling fuel transfer between fuel tanks located in left, right, fore, and aft sections of the aircraft.

9. A navigational control for an aircraft having an underwing engine and the ability to laterally transfer fuel between fuel tanks, comprising:

a thrust control, said thrust control controlling thrust the engine;

a lateral fuel transfer control, said lateral fuel transfer control controlling lateral transfer of fuel between said fuel tanks located in left, right, fore, and aft sections of the aircraft to control and shift a center of gravity of the aircraft;

a coordinator, said coordinator coupled to said thrust control and said lateral fuel transfer control, said coordinator coordinating said thrust control and said lateral fuel transfer control to effect navigational control over the aircraft, said coordinator comprising:

a flight control computer, said flight control computer implementing flight control software coordinating said thrust control and said lateral fuel transfer control; and a flight yoke or autopilot knob, said flight yoke or autopilot knob coupled to said flight control computer and coordinatingly controlling engine thrust via said thrust control and lateral fuel allocation via said lateral fuel transfer control to deliver navigational control of the aircraft to a pilot; whereby navigational control over the aircraft is effected by said coordinator when said coordinator adjustably controls said thrust of the engine and location of fuel between and among said fuel tanks in conjunction with one another.

* * * * *